(12) United States Patent
Clark et al.

(10) Patent No.: US 10,378,443 B2
(45) Date of Patent: Aug. 13, 2019

(54) BYPASS VALVE SYSTEM STATE INDICATION

(71) Applicant: UNITED TECHNOLOGIES CORPORATION, Farmington, CT (US)

(72) Inventors: Richard W. Clark, Jensen Beach, FL (US); Javier A. Cué, Palm Beach Gardens, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 310 days.

(21) Appl. No.: 15/422,921

(22) Filed: Feb. 2, 2017

(65) Prior Publication Data

US 2018/0216530 A1    Aug. 2, 2018

(51) Int. Cl.
*B01D 46/00* (2006.01)
*F01D 17/08* (2006.01)
(Continued)

(52) U.S. Cl.
CPC .......... *F02C 7/052* (2013.01); *B01D 35/1435* (2013.01); *B01D 35/1475* (2013.01); *B01D 46/0087* (2013.01); *F01D 17/08* (2013.01); *F01D 17/105* (2013.01); *F02C 7/057* (2013.01); *F02C 7/232* (2013.01); *F16K 17/04* (2013.01); *F16K 37/0025* (2013.01);
(Continued)

(58) Field of Classification Search
CPC ............ B01D 2279/60; B01D 35/1435; B01D 35/1475; B01D 46/0087; F01D 17/08; F01D 17/105; F02C 7/052; F02C 7/057; F02C 7/232; F05D 2230/72; F05D 2260/606; F05D 2260/607; F05D 2260/80; F05D 2270/806; F05D 2270/821; F16K 17/04; F16K 37/0025; F16K 37/0041; Y02T 50/675
See application file for complete search history.

(56) References Cited

U.S. PATENT DOCUMENTS

| 2,729,339 A | 1/1956 | McCoy | |
|---|---|---|---|
| 3,464,556 A * | 9/1969 | Cullen | B01D 35/143 210/90 |

(Continued)

OTHER PUBLICATIONS

European Patent Office, European Search Report dated Jun. 29, 2018 in Application No. 18152765.6.

*Primary Examiner* — William M McCalister
(74) *Attorney, Agent, or Firm* — Snell & Wilmer, L.L.P.

(57) ABSTRACT

A fluid system may comprise a fluid passage comprising a passage inlet and a passage outlet, through which fluid may flow by entering the passage inlet as an inlet flow and exiting the passage outlet as an outlet flow; a bypass valve comprising a bypass inlet and a bypass outlet, the bypass inlet being in fluid communication with the passage inlet, wherein the bypass valve further comprises a piston coupled to a spring; and a position sensor coupled to the bypass valve and configured to detect a position of the piston in the bypass valve. The spring may retain the piston in a rest position, and the spring and the piston may be configured to block the fluid from passing through the bypass outlet in response to the inlet flow exerting a pressure below a bypass pressure threshold.

11 Claims, 5 Drawing Sheets

(51) Int. Cl.
*F02C 7/232* (2006.01)
*F16K 17/04* (2006.01)
*F16K 37/00* (2006.01)
*B01D 35/147* (2006.01)
*F01D 17/10* (2006.01)
*F02C 7/052* (2006.01)
*F02C 7/057* (2006.01)
*B01D 35/143* (2006.01)

(52) U.S. Cl.
CPC ...... *F16K 37/0041* (2013.01); *B01D 2279/60* (2013.01); *F05D 2230/72* (2013.01); *F05D 2260/606* (2013.01); *F05D 2260/607* (2013.01); *F05D 2260/80* (2013.01); *F05D 2270/806* (2013.01); *F05D 2270/821* (2013.01); *Y02T 50/675* (2013.01)

(56) References Cited

U.S. PATENT DOCUMENTS

| | | | |
|---|---|---|---|
| 3,487,929 A * | 1/1970 | Downey | B01D 29/114 210/90 |
| 3,626,474 A | 12/1971 | Hammer | |
| 3,670,889 A * | 6/1972 | Brown | B01D 35/147 210/90 |
| 3,790,931 A * | 2/1974 | Leveraus | B01D 35/143 210/133 |
| 3,970,104 A * | 7/1976 | Decker | B01D 35/143 137/494 |
| 4,654,140 A | 3/1987 | Chen | |
| 4,827,714 A * | 5/1989 | Miles | F02C 7/228 60/39.091 |
| 4,932,205 A | 6/1990 | Alderfer | |
| 5,879,544 A * | 3/1999 | Cassidy | G01L 19/12 116/268 |
| 7,284,570 B1 * | 10/2007 | Gracik | F16K 31/046 137/554 |
| 7,347,050 B2 * | 3/2008 | Gainford | F02C 7/22 123/198 D |
| 8,925,322 B2 * | 1/2015 | Scully | F02C 7/228 60/734 |
| 9,441,598 B2 * | 9/2016 | Futa | F02M 69/04 |
| 9,463,402 B2 * | 10/2016 | Colotte | B01D 35/143 |
| 2015/0219242 A1 * | 8/2015 | Almazan | F16K 37/0041 137/554 |

* cited by examiner

BYPASS VALVE SYSTEM STATE INDICATION

FIELD

This disclosure generally relates to bypass valves.

BACKGROUND

Fluid passages in vehicles (e.g., aircraft, automobiles, boats, etc.) may, over time, accumulate impurities from the fluid flowing through such fluid passages. The impurities may cause blockages in the fluid passages. As a result, there may be a pressure differential between the fluid flow into the fluid passage (inlet flow) and the fluid flow out the fluid passage (outlet flow). Because of the blockage in the fluid passage, the inlet flow may have a higher pressure than the outlet flow. If the inlet flow reaches a certain pressure threshold, a bypass valve may open to allow some of the inlet flow through the bypass valve to reduce the pressure. The bypass valve opening may indicate that the fluid passage (such as a filter or heat exchanger) may need to be replaced because there is significant buildup of impurities in the fluid passage.

SUMMARY

In various embodiments, a fluid system may comprise a fluid passage comprising a passage inlet and a passage outlet, through which fluid may flow by entering the passage inlet as an inlet flow and exiting the passage outlet as an outlet flow; a bypass valve comprising a bypass inlet and a bypass outlet, the bypass inlet being in fluid communication with the passage inlet, wherein the bypass valve further comprises a piston coupled to a spring; and a position sensor coupled to the bypass valve and configured to detect a position of the piston in the bypass valve. The spring may retain the piston in a rest position, and the spring and the piston may be configured to block the fluid from passing through the bypass outlet in response to the inlet flow exerting a pressure below a bypass pressure threshold. In various embodiments, the fluid passage may be at least one of an oil filter, a fuel filter, an air filter, or a heat exchanger. In various embodiments, the position sensor may be at least one of a proximity probe, a linear variable differential transformer, a sonar device, or a magnetic pickup. In various embodiments, the bypass valve may comprise a cap coupled to the spring, wherein the spring may be disposed between the cap and the piston, and the position sensor may be coupled to the cap.

In various embodiments, the piston may be in the rest position in the bypass outlet, wherein the bypass outlet comprises an outlet surrounding wall and a portion of the outlet surrounding wall is a bypass slack area, wherein the piston may be in the rest position in the bypass slack area, and the piston may be configured to move along the bypass slack area in response to a pressure threshold being reached by the inlet flow in the passage inlet before allowing fluid to flow through the bypass outlet. In various embodiments, the piston may be in the rest position in the bypass inlet, wherein the bypass inlet comprises an inlet surrounding wall and a portion of the inlet surrounding wall adjacent to the bypass outlet is a bypass slack area, wherein the piston may be in the rest position at a slack area end furthest from the bypass outlet, and the piston is configured to move along the bypass slack area toward the bypass outlet in response to a pressure threshold being reached by the inlet flow in the passage inlet. In various embodiments, the bypass valve may be configured to allow the piston to move along the bypass slack area in response to the pressure threshold being reached by the inlet flow in the passage inlet before allowing the fluid to pass through the bypass outlet. In various embodiments, the bypass valve may be configured to pass the fluid through the bypass outlet in response to the piston moving past the bypass slack area caused by the inlet flow reaching the bypass pressure threshold, and in response to the piston moving past the bypass slack area, the bypass outlet is in fluid communication with the bypass inlet.

In various embodiments, the fluid system may further comprise a control system in electronic communication with the position sensor, wherein the position sensor transmits the position of the piston to the control system. In various embodiments, the control system may comprise a processor and may be configured to determine at least one of an impending bypass flow through the bypass outlet in response to the piston being moved to a displaced position along the bypass slack area from the rest position without allowing the fluid to pass through the bypass outlet, or a bypass flow through the bypass outlet in response to the piston moving past the bypass slack area and allowing the fluid to pass through the bypass outlet.

In various embodiments, an aircraft may comprise a gas turbine engine and a fluid system at least one of coupled to, or in fluid communication with, the gas turbine engine. In various embodiments, the fluid system may comprise a fluid passage comprising a passage inlet and a passage outlet, through which fluid may flow by entering the passage inlet as an inlet flow and exiting the passage outlet as an outlet flow; a bypass valve comprising a bypass inlet and a bypass outlet, the bypass inlet being in fluid communication with the passage inlet, wherein the bypass valve further comprises a piston coupled to a spring; and a position sensor coupled to the bypass valve and configured to detect a position of the piston in the bypass valve. The spring may retain the piston in a rest position, and the spring and the piston may be configured to block the fluid from passing through the bypass outlet in response to the inlet flow exerting a pressure below a bypass pressure threshold.

In various embodiments, the piston may be in the rest position in the bypass outlet, wherein the bypass outlet comprises an outlet surrounding wall and a portion of the outlet surrounding wall is a bypass slack area, wherein the piston may be in the rest position in the bypass slack area, and the piston may be configured to move along the bypass slack area in response to a pressure threshold being reached by the inlet flow in the passage inlet before allowing fluid to flow through the bypass outlet. In various embodiments, the piston may be in the rest position in the bypass inlet, wherein the bypass inlet comprises an inlet surrounding wall and a portion of the inlet surrounding wall adjacent to the bypass outlet is a bypass slack area, wherein the piston may be in the rest position at a slack area end furthest from the bypass outlet, and the piston is configured to move along the bypass slack area toward the bypass outlet in response to a pressure threshold being reached by the inlet flow in the passage inlet.

In various embodiments, the aircraft may further comprise a control system in electronic communication with the position sensor, wherein the position sensor may transmit the position of the piston to the control system. In various embodiments, the control system may comprise a processor and may be configured to determine at least one of an impending bypass flow through the bypass outlet in response to the piston being moved along the bypass slack area from the rest position without allowing the fluid to pass through the bypass outlet, or a bypass flow through the bypass outlet in response to the piston moving past the bypass slack area and allowing the fluid to pass through the bypass outlet.

In various embodiments, method for monitoring a fluid passage may comprise passing a fluid through the fluid passage in a fluid system by the fluid entering a fluid inlet as an inlet flow and exiting through a fluid outlet as an outlet flow, wherein the fluid system comprises a bypass valve having a bypass inlet fluidly coupled to a passage inlet and a bypass outlet, wherein the bypass valve further comprises a piston in the passage inlet coupled to a spring, wherein the spring retains the piston in a rest position, and the spring and the piston are configured to block the fluid from passing through the bypass outlet in response to the inlet flow exerting a pressure below a bypass pressure threshold; detecting, by a position sensor coupled to the bypass valve, a position of the piston in the passage inlet; and determining, by a processor, whether the piston has moved from the rest position.

In various embodiments, the bypass inlet may comprise an inlet surrounding wall and a portion of the inlet surrounding wall adjacent to the bypass outlet is a bypass slack area, wherein the piston is in the rest position at a slack area end furthest from the bypass outlet of the bypass slack area, and the piston is configured to move along the bypass slack area toward the bypass outlet in response to the pressure threshold being reached by the inlet flow in the passage inlet before allowing the fluid to pass through the bypass outlet.

In various embodiments, the method may further comprise determining, by the processor, an impending bypass flow in response to determining that the piston has moved from the rest position to a displaced position along the bypass slack area. In various embodiments, the method may further comprise determining, by the processor, a bypass flow in response to determining that the piston has moved from the rest position to a bypass position, wherein the bypass position is when the piston has moved past the bypass slack area, causing the fluid to pass through bypass outlet.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
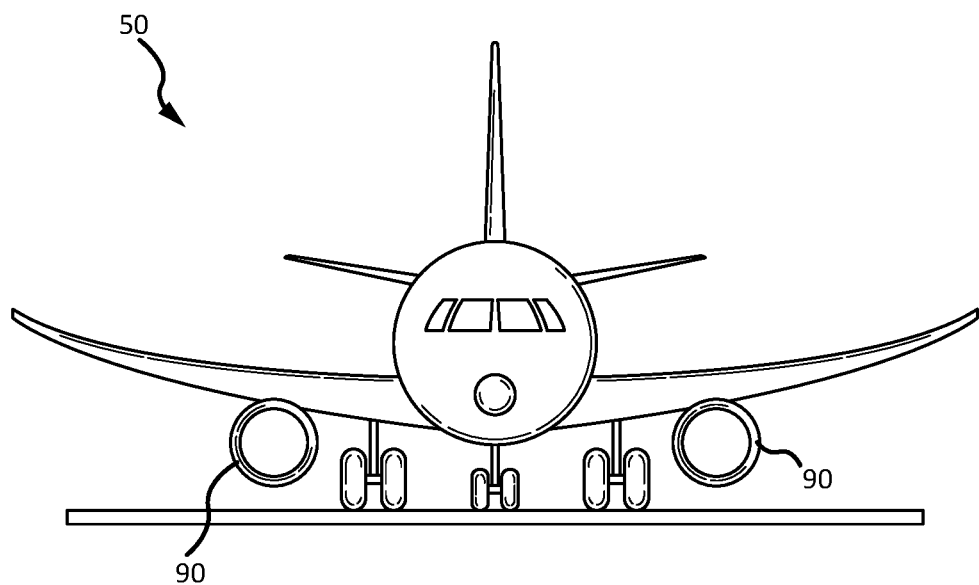
FIG. 1 illustrates a perspective view of an aircraft, in accordance with various embodiments.
Figure 2:
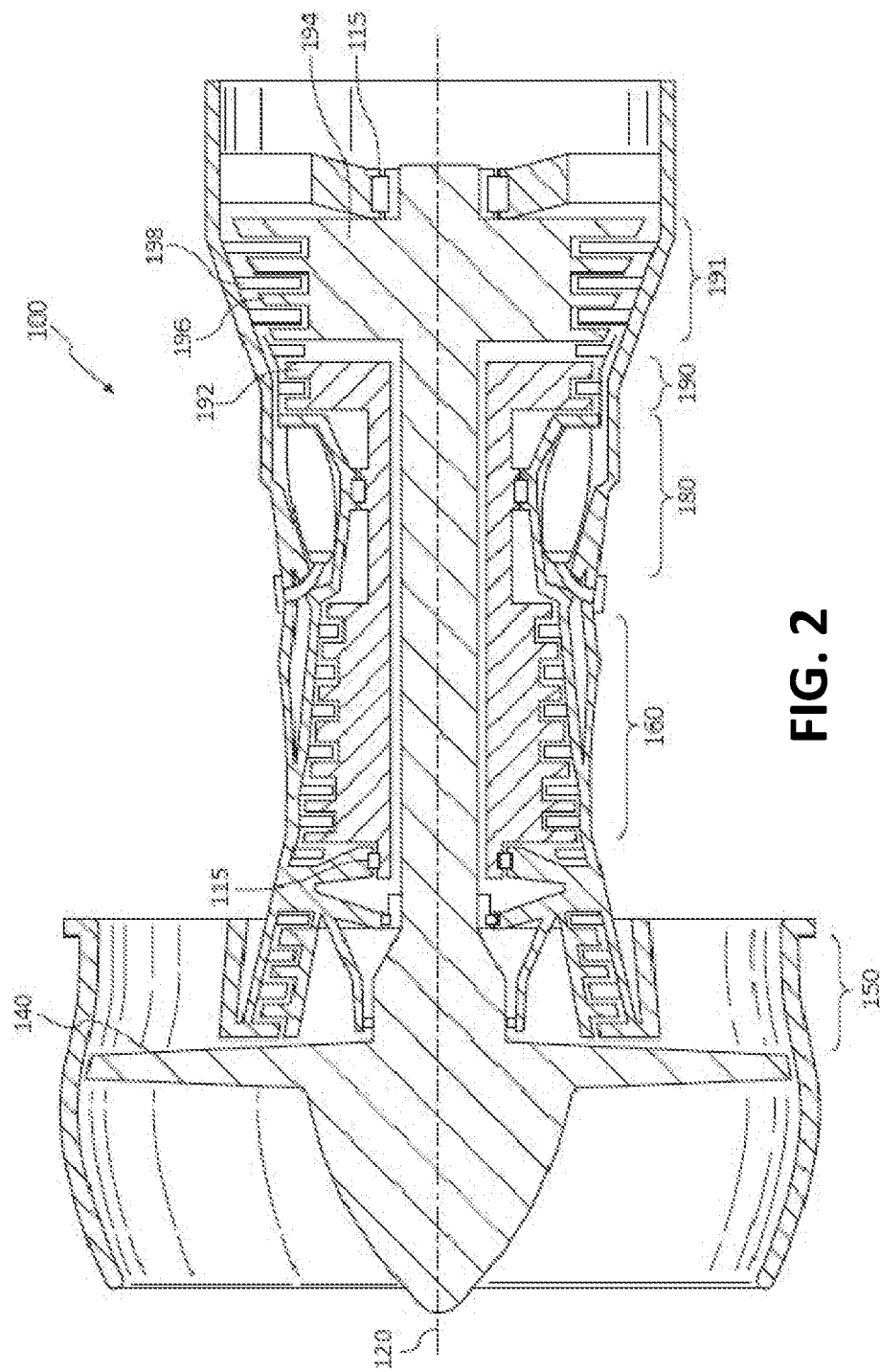
FIG. 2 illustrates a perspective view of a gas turbine engine, in accordance with various embodiments.

Aircraft, such as aircraft 50 depicted in FIG. 1, may comprise a gas turbine engine 90. Referring to FIG. 2, a gas turbine engine 100 (such as a turbofan gas turbine engine) is illustrated according to various embodiments. Gas turbine engine 100 is disposed about axis of rotation 120. Gas turbine engine 100 may comprise a fan 140, compressor sections 150 and 160, a combustion section 180, and turbine sections 190, 191. Air compressed in compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools to which the rotors are affixed in gas turbine engine 100. FIG. 2 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

In various embodiments, referring to FIGS. 1 and 2, aircraft 50 (or other vehicles such as automobiles, boats, etc.) may comprise fluid passages, which may be any device used for the processing of fluid within the vehicle. Fluid passages may also be in fluid communication with or comprised in an engine within a vehicle (e.g., gas turbine engine 100). For example, a fluid passage may be an oil filter, fuel filter, and/or an air filter implemented to remove impurities from the fluid (e.g., oil, fuel, and/or air, respectively), or a heat exchanger.

Figure 3:
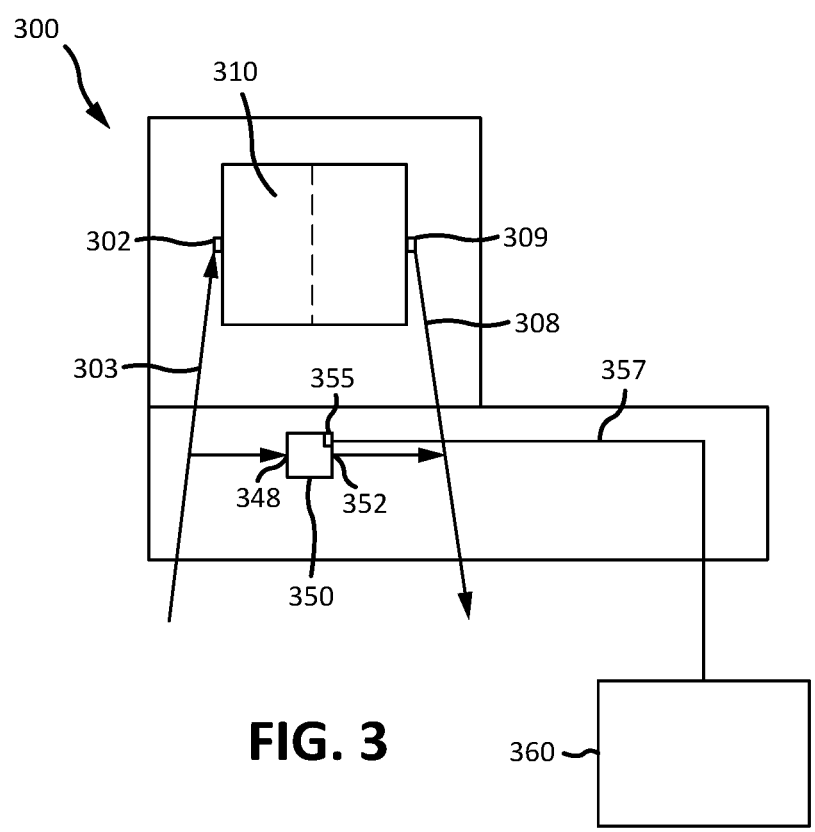
FIG. 3 illustrates a schematic view of a fluid system, in accordance with various embodiments.

FIG. 3 illustrates a fluid system 300 comprising a fluid passage 310, a bypass valve 350, and a control system 360. In various embodiments, fluid passage 310 may comprise a passage inlet 302 through which the fluid to be processed (e.g., filtered, cooled, heated) may enter fluid passage 310 (i.e., an inlet flow 303), and a passage outlet 309 through which the processed fluid may exit fluid passage 310 (i.e., an outlet flow 308). Over time, as the fluid passes through fluid passage 310, impurities may accumulate and create blockages in fluid passage 310. Therefore, as blockages accumulate in fluid passage 310, the inlet flow pressure associated with the inlet flow 303 through passage inlet 302 may have a higher pressure than the outlet flow pressure associated with the outlet flow 308 through passage outlet 309.

In various embodiments, bypass valve 350 may be configured to relieve pressure in the inlet flow 303 of passage inlet 302 in response to the inlet flow pressure reaching a certain threshold (i.e., a "bypass pressure threshold"). Bypass valve 350 may comprise a bypass inlet 348 in fluid communication with passage inlet 302, and a bypass outlet 352. If the inlet flow pressure in passage inlet 302 is below the bypass pressure threshold, bypass valve 350 may be closed such that no fluid may flow through bypass inlet 348 and/or bypass outlet 352. In response to the inlet flow 303 reaching the bypass pressure threshold, bypass valve 350 may open allowing fluid to pass through bypass valve 350 from bypass inlet 348 to bypass outlet 352 to relieve pressure from the inlet flow 303 in passage inlet 302. In various embodiments, bypass outlet 352 may be in fluid communication with passage outlet 309, and therefore, in response to bypass valve 350 being open, fluid exiting bypass valve 350 through bypass outlet 352 may join the outlet flow 308 in passage outlet 309. In various embodiments, bypass outlet 352 may be in fluid communication with other portions of fluid system 300 or other part of the vehicle comprising fluid system 300. In such embodiments, in response to bypass valve 350 being open, fluid exiting bypass valve 350 through bypass outlet 352 may travel to another part of fluid system 300 or the vehicle.

Figure 4A:
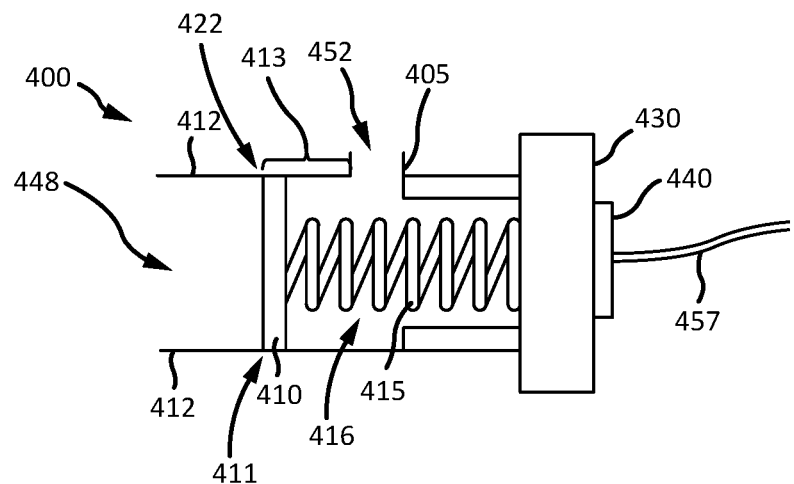
FIGS. 4A and 4B illustrate perspective views of a bypass valve, in accordance with various embodiments.
Figure 4B:
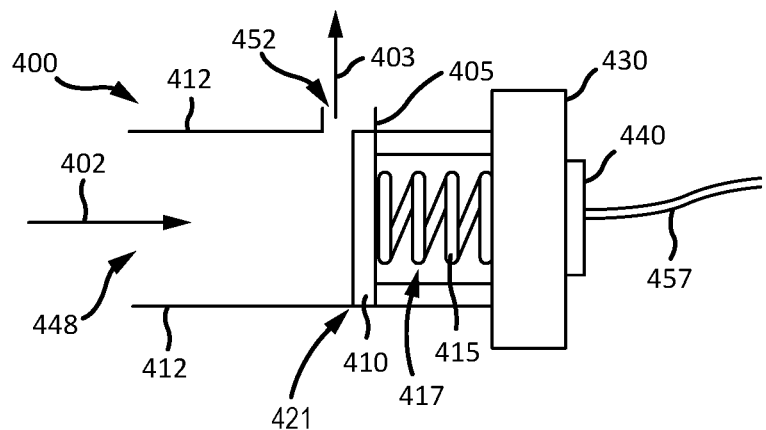

With reference to FIGS. 4A and 4B, a bypass valve 400 (an example of bypass valve 350 in FIG. 3) may comprise a bypass inlet 448 having an inlet surrounding wall 412, a bypass outlet 452 having an outlet surrounding wall 405, a piston 410 disposed in bypass inlet 448 and/or bypass outlet 452 blocking, a spring 415 coupled to the piston 410, a cap 430 coupled to spring 415, wherein spring 415 is coupled between piston 410 and cap 430, and/or a position sensor 440 configured to detect the position of piston 410. Inlet surrounding wall 412 and outlet surrounding wall 405 may be circular in cross section, or any suitable geometric shape (e.g., square, rectangle, octagon, hexagon, or the like). With additional reference to FIG. 3, and implementing bypass valve 400 in fluid system 300 (as bypass valve 350), bypass inlet 448 may be in fluid communication with passage inlet 302. Piston 410 may be disposed in bypass inlet 448 and/or bypass outlet 452 such that piston 410 blocks the fluid from flowing through bypass outlet 452 of bypass valve 400. Spring 415 may retain piston 410 in a rest position 411 due to the bias of spring 415. When piston 410 is in rest position 411, spring 415 may be in a relaxed position 416.

In various embodiments, piston 410 may be disposed in bypass inlet 448, and therefore rest position 411 may be in bypass inlet 448 as well. As discussed herein, the inlet flow pressure in passage inlet 302 may apply pressure on piston 410 and spring 415. Spring 415 may be configured to retain piston 410 in rest position 411. However, in response to the inlet flow pressure in passage inlet 302 reaching a pressure threshold, spring 415 may compress and piston 410 may move toward bypass outlet 452. The area of inlet surrounding wall 412 which spans between rest position 411 and bypass outlet 452 may be a bypass slack area 413, along which piston 410 may move as a result of inlet flow pressure increasing above the pressure threshold without opening bypass valve 400 by allowing fluid through bypass outlet 452. Piston 410 being moved from rest position 411 (located at a slack area end 422 of bypass slack area 413 furthest from bypass outlet 452) to a place along bypass slack area 413 such that piston 410 still blocks bypass outlet 452 may be referred to as an "impending bypass flow" because the inlet flow pressure will have almost reached the bypass pressure threshold which will open bypass outlet 452 (i.e., a bypass flow is impending). In response to piston 410 moving to a place along bypass slack area 413, such a position of piston 410 may referred to as a displaced position.

In various embodiments, the inlet flow pressure increasing to the pressure threshold, or above the pressure threshold, but below the bypass pressure threshold, may move piston 410 along bypass slack area 413 toward bypass outlet 452. In response to inlet flow pressure in passage inlet 302 reaching the bypass pressure threshold (or above), spring 415 may have been compressed enough by the inlet flow pressure to cause piston 410 to move in the direction of bypass inlet flow 402 past bypass slack area 413, and therefore, allow fluid to flow through bypass valve 400 and out bypass outlet 452 as bypass outlet flow 403 (i.e., a "bypass flow" has occurred). In such a position, piston 410 may be in a bypass position 421, which may be a position of piston 410 that allows fluid through bypass outlet 452. In response to piston 410 being in bypass position 421, spring 415 may be in a compressed position 417. In various embodiments, spring 415 may be compressed to varying degrees, and piston 410 may be pushed by inlet flow pressure to varying degrees so that piston 410 remains in bypass position 421 (i.e., to allow fluid flow through bypass valve 400). In various embodiments, bypass outlet 452 may be completely open before piston 410 has been pushed by inlet flow pressure to a point of maximum compression.

While FIGS. 4A and 4B depicted piston 410 and spring 415 being disposed in bypass inlet 448, in various embodiments, the piston and spring may be disposed in bypass outlet 452. In such embodiments, the rest position of the piston may be in bypass outlet 452, along with the bypass slack area along outlet surrounding wall 405. In such embodiments, similar to the embodiments pictured in FIGS. 4A and 4B discussed herein, the inlet flow pressure reaching the pressure threshold may compress the spring and move the piston from the rest position in bypass outlet 452 along the bypass slack area along outlet surrounding wall 405. In response to the inlet flow pressure reaching the bypass pressure threshold, the spring may be further compressed and the piston may be pushed past the bypass slack area, such that fluid may flow through bypass valve 400 through bypass outlet 452 as bypass outlet flow 403. In various embodiments, the spring may be disposed in any suitable configuration such that it applies pressure to maintain, or be biased to maintain, the piston in the rest position.

In various embodiments, with continued reference to FIGS. 3, 4A, and 4B, position sensor 440 may be comprised in, and/or coupled to, bypass valve 400 on any suitable portion of bypass valve 400. As depicted in FIGS. 4A and 4B, position sensor 440 may be coupled to cap 430, in accordance with various embodiments. However, in various embodiments, position sensor 440 may be coupled to inlet surrounding wall 412, outlet surrounding wall 405, piston 410, a housing enclosing bypass valve 400, or any other suitable location. Position sensor 440 may be configured to detect the position of piston 410. For example, position sensor 440 may detect if piston 410 is in rest position 411, in a displaced position along bypass slack area 413, and/or if piston 410 is in a bypass position 421.

Position sensor 440 may be any suitable position sensor. In various embodiments, position sensor 440 may be a sonar device which emits sound wave pulses and detects changes in sound wave feedback (i.e., sound wave echoes) to determine the position of an object (e.g., piston 410). In various embodiments, position sensor 440 may be a magnetic pickup which detects changes in a surrounding magnetic field based on movement of an object (e.g., piston 410). In various embodiments, position sensor 440 may be a linear variable differential transformer (LVDT) which detects changes in electromagnetic flux based on changes in position of an object (e.g., piston 410). In various embodiments, position sensor 440 may be a proximity probe which emits an electromagnetic field or electromagnetic radiation and detects changes in the field or return signals indicating the change in position of an object (e.g., piston 410). In various embodiments, rest position 411 may be the zero or standard to which all other position readings or information are compared. In various embodiments, position sensor 440 may be comprised in, or in electrical communication with, control system 360 via wiring 457 (or as depicted in FIG. 3, position sensor 355 is in electrical communication with control system 360 via wiring 357). In various embodiments, position sensor 440 may convert the detection and information of the position of piston 410 into an electrical signal, and transmit the signal to control system 360 for processing. In various embodiments, position sensor 440 may comprise a processor to analyze the position information collected.

In various embodiments, control system 360 (or position sensor 440) may comprise a processor configured to implement various logical operations in response to execution of instructions, for example, instructions stored on a non-transitory, tangible, computer-readable medium. Control system 360 may be a full authority digital engine control ("FADEC"), or control system 360 may be a dedicated engine health monitoring device separate from the FADEC.

In various embodiments, control system 360 may receive the transmission from position sensor 355, and determine the position of piston 410 and/or whether piston 410 has moved from rest position 411. In response to control system 360 determining that piston 410 is in rest position, control system 360 may take no action, or send a notification to an operator that there is no change in piston 410's position. In response to control system 360 determining that piston 410 is in a displaced position along bypass slack area 413, control system 360 may determine that there is an impending bypass flow because inlet flow pressure has reached at least the pressure threshold to push piston 410 from rest position 411. In such a case, control system 360 may transmit a notification that the appropriate maintenance should be taken to avoid a bypass flow (e.g., replacing fluid passage 310, such as a filter or a heat exchanger). In response to control system 360 determining that piston 410 is in a bypass position 421, control system 360 may determine that there is a bypass flow because inlet flow pressure has reached at least the bypass pressure threshold to push piston 410 far enough to open bypass valve 400 and allow fluid to pass through bypass outlet 452. In such a case, control system 360 may transmit a notification that the appropriate maintenance should be taken to avoid further bypass flow (e.g., replacing fluid passage 310, such as a filter or a heat exchanger).

The fluid systems described herein allow accurate monitoring of a fluid passage such that the timing of maintenance may maximize life of the fluid passage. The inlet flow pressure and outlet flow pressure do not need to be measured and compared to determine whether the fluid passage need maintenance or replacement, therefore, eliminating the inherent inaccuracies of such a monitoring technique.

Figure 5:
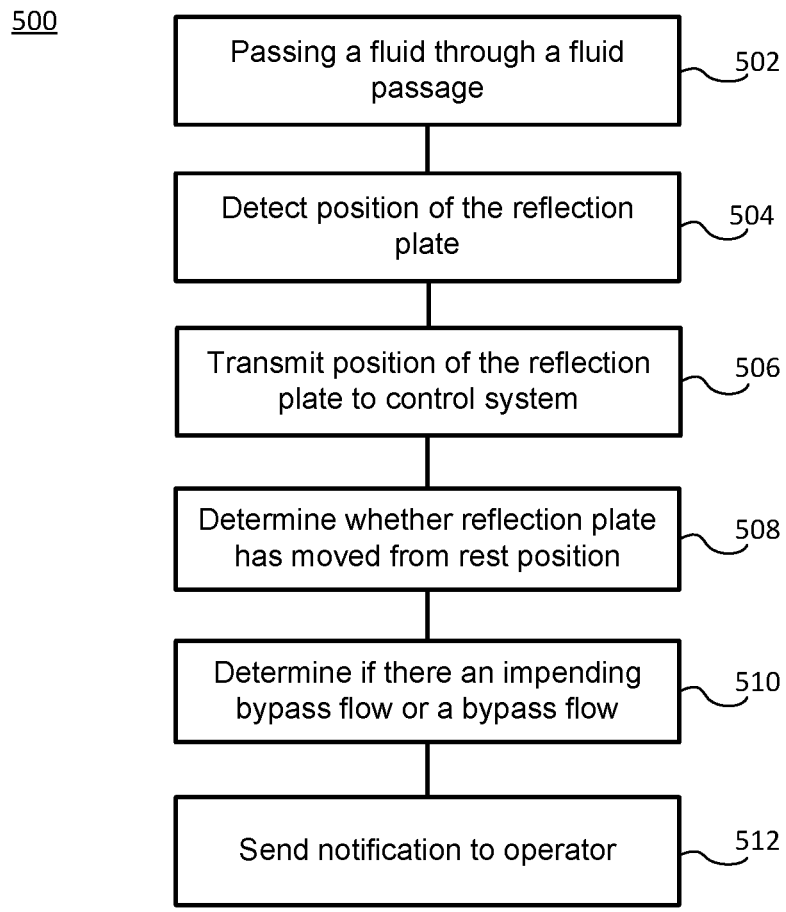
FIG. 5 illustrates a method for monitoring a fluid passage, in accordance with various embodiments.

In accordance with various embodiments, FIG. 5 depicts a method 500 for monitoring a fluid passage. With combined reference to FIGS. 3-5, in various embodiments, a fluid may be passed through fluid passage 310 (step 502) through passage inlet 302 and passage outlet 309. Over time, impurities may accumulate in fluid passage 310 and create blockages in fluid passage 310. Therefore, the inlet flow pressure in passage inlet 302 may increase. As described herein, bypass valve 400 is comprised in the fluid system 300 in which fluid passage 310 is being utilized. While fluid is flowing through fluid passage 310, position sensor 440 of bypass valve 400 may be detecting the position of the piston (step 504). Position sensor 440 may transmit the detected position information for piston 410 to control system 460 (step 506) for processing. In various embodiments, position sensor 440 may process the position information.

A processor in control system 460 (or position sensor 440) may determine whether piston 410 moved from rest position 411 (step 508), which would indicate that the inlet flow pressure in passage inlet 302 has reached or exceeded the pressure threshold. The processor may compare the received position information for piston 410 with a standard (e.g., rest position 411). As a simple example, rest position 411 may be represented by "1," bypass position 421 may be represented by "5," and a displaced position in bypass slack area 413 is anywhere between 1 and 5. The standard may be 1 (rest position 411). Therefore, if the received position information is a 1, then the processor determines that piston 410 is in rest position 411. If the received position information is a 2, the processor determines that piston 410 is in a displaced position along bypass slack area 413. Accordingly, in response to the processor determining that piston 410 has moved from rest position 411, the processor may determine whether there is an impending bypass flow or a bypass flow (step 510). In response to it being determined that piston 410 is at a displaced position along bypass slack area 413, the processor may determine that there is an impending bypass flow. In response to it being determined that piston 410 is at bypass position 421, the processor may determine that there is a bypass flow. In response to an impending bypass flow or a bypass flow being detected (indicating a pressure build-up in passage inlet 302 and blockage in fluid passage 310), the processor may send a notification to an operator (step 512) advising that maintenance to, or replacement of, fluid passage 310 may be desired.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fluid system, comprising:
   a fluid passage comprising a passage inlet and a passage outlet, wherein the fluid passage is configured to allow a fluid to pass through the fluid passage by entering the passage inlet as an inlet flow and exiting the passage outlet as an outlet flow;
   a bypass valve comprising a bypass inlet and a bypass outlet, the bypass inlet being in fluid communication with the passage inlet, wherein the bypass valve further comprises a piston coupled to a spring, wherein the spring retains the piston in a rest position, and the spring and the piston are configured to block the fluid from passing through the bypass outlet in response to the inlet flow exerting a pressure below a bypass pressure threshold, wherein the piston is in the rest position in the bypass inlet, wherein the bypass inlet comprises an inlet surrounding wall, wherein a portion of the inlet surrounding wall adjacent to the bypass outlet is a bypass slack area, wherein the piston is in the rest position at a slack area end furthest from the bypass outlet, and the piston is configured to move along the bypass slack area toward the bypass outlet in response to a pressure threshold being reached by the inlet flow in the passage inlet before allowing the fluid to pass through the bypass outlet;
   a position sensor coupled to the bypass valve and configured to detect a position of the piston in the bypass valve; and
   a control system in electronic communication with the position sensor, wherein the position sensor transmits the position of the piston to the control system, wherein the control system comprises a processor and is configured to determine an impending bypass flow through the bypass outlet in response to the piston being moved to a displaced position along the bypass slack area from the rest position without allowing the fluid to pass through the bypass outlet.

2. The fluid system of claim 1, wherein the fluid passage is at least one of an oil filter, a fuel filter, or an air filter.

3. The fluid system of claim 1, wherein the fluid passage is a heat exchanger.

4. The fluid system of claim 1, wherein the bypass valve is configured to pass the fluid through the bypass outlet in response to the piston moving past the bypass slack area caused by the inlet flow reaching the bypass pressure threshold, and in response to the piston moving past the bypass slack area, the bypass outlet is in fluid communication with the bypass inlet.

5. The fluid system of claim 1, wherein the control system is further configured to determine a bypass flow through the bypass outlet in response to the piston moving past the bypass slack area and allowing the fluid to pass through the bypass outlet.

6. The fluid system of claim 1, wherein the position sensor is at least one of a proximity probe, a linear variable differential transformer, a sonar device, or a magnetic pickup.

7. The fluid system of claim 1, wherein the bypass valve comprises a cap coupled to the spring, wherein the spring is disposed between the cap and the piston, and the position sensor is coupled to the cap.

8. An aircraft, comprising:
   a gas turbine engine;
   a fluid system at least one of coupled to, or in fluid communication with, the gas turbine engine, comprising:
      a fluid passage comprising a passage inlet and a passage outlet, wherein the fluid passage is configured to allow a fluid to pass through the fluid passage by entering the passage inlet as an inlet flow and exiting the passage outlet as an outlet flow;
      a bypass valve comprising a bypass inlet and a bypass outlet, the bypass inlet being in fluid communication with the passage inlet, wherein the bypass valve further comprises a piston coupled to a spring, wherein the spring retains the piston in a rest position, and the spring and the piston are configured to block the fluid from passing through the bypass outlet in response to the inlet flow exerting a pressure below a bypass pressure threshold, wherein the piston is in the rest position in the bypass inlet, wherein the bypass inlet comprises an inlet surrounding wall, wherein a portion of the inlet surrounding wall adjacent to the bypass outlet is a bypass slack area, wherein the piston is in the rest position at a slack area end furthest from the bypass outlet, and the piston is configured to move along the bypass slack area toward the bypass outlet in response to a pressure threshold being reached by the inlet flow in the passage inlet before allowing the fluid to pass through the bypass outlet;

a position sensor coupled to the bypass valve and configured to detect a position of the piston in the bypass valve; and a control system in electronic communication with the position sensor, wherein the position sensor transmits the position of the piston to the control system, wherein the control system comprises a processor and is configured to determine an impending bypass flow through the bypass outlet in response to the piston being moved to a displaced position along the bypass slack area from the rest position without allowing the fluid to pass through the bypass outlet.

9. The aircraft of claim 8, wherein the control system is further configured to determine a bypass flow through the bypass outlet in response to the piston moving past the bypass slack area and allowing the fluid to pass through the bypass outlet.

10. A method for monitoring a fluid passage, comprising:

passing a fluid through the fluid passage in a fluid system by the fluid entering a fluid inlet as an inlet flow and exiting through a fluid outlet as an outlet flow, wherein the fluid system comprises a bypass valve having a bypass inlet fluidly coupled to a passage inlet and a bypass outlet, wherein the bypass valve further comprises a piston in the passage inlet coupled to a spring, wherein the spring retains the piston in a rest position, and the spring and the piston are configured to block the fluid from passing through the bypass outlet in response to the inlet flow exerting a pressure below a bypass pressure threshold, wherein the bypass inlet comprises an inlet surrounding wall, wherein a portion of the inlet surrounding wall adjacent to the bypass outlet is a bypass slack area, wherein the piston is in the rest position at a slack area end furthest from the bypass outlet of the bypass slack area, and the piston is configured to move along the bypass slack area toward the bypass outlet in response to the pressure threshold being reached by the inlet flow in the passage inlet before allowing the fluid to pass through the bypass outlet;

detecting, by a position sensor coupled to the bypass valve, a position of the piston in the passage inlet;

determining, by a processor, whether the piston has moved from the rest position; and determining, by the processor, an impending bypass flow in response to determining that the piston has moved from the rest position to a displaced position along the bypass slack area.

11. The method of claim 10, further comprising determining, by the processor, a bypass flow in response to determining that the piston has moved from the rest position to a bypass position, wherein the bypass position is when the piston has moved past the bypass slack area, causing the fluid to pass through bypass outlet.

* * * * *